(12) United States Patent
Nicolazzo et al.

(10) Patent No.: US 7,788,995 B2
(45) Date of Patent: Sep. 7, 2010

(54) PIPE FITTING SOCKET FOR USE WITH AN AXIAL DRIVE MECHANISM

(76) Inventors: Randy Nicolazzo, 5559 Route 528, South Madison, OH (US) 44057; Michael B. Holloman, 5544 North Ridge E., Ashtabula, OH (US) 44004

( * ) Notice: Subject to any disclaimer, the term of this patent is extended or adjusted under 35 U.S.C. 154(b) by 0 days.

(21) Appl. No.: 12/200,665

(22) Filed: Aug. 28, 2008

(65) Prior Publication Data

US 2010/0052311 A1 Mar. 4, 2010

(51) Int. Cl.
 *B25B 13/06* (2006.01)
(52) U.S. Cl. ..................... 81/124.2
(58) Field of Classification Search ............... 18/124.2; 285/39
See application file for complete search history.

(56) References Cited

U.S. PATENT DOCUMENTS

| | | | |
|---|---|---|---|
| 5,005,451 A * | 4/1991 | Lee et al. ............. | 81/487 |
| 6,609,445 B2 * | 8/2003 | Elmore ................ | 81/124.2 |
| 6,871,401 B1 * | 3/2005 | Blankenship ......... | 29/890.124 |
| 6,955,183 B2 * | 10/2005 | McCarthy ............ | 137/315.41 |
| 2002/0096023 A1 * | 7/2002 | Sanford ............... | 81/124.2 |
| 2007/0012143 A1 * | 1/2007 | Tracy ................. | 81/124.2 |

FOREIGN PATENT DOCUMENTS

| CH | 685686 A5 * | 9/1995 |
|---|---|---|
| DE | 3223109 A1 * | 12/1983 |
| DE | 3232196 A1 * | 3/1984 |

* cited by examiner

*Primary Examiner*—David B Thomas
(74) *Attorney, Agent, or Firm*—Dwight A. Stauffer

(57) ABSTRACT

A pipe fitting socket for use with an axial driving device accepts a variety of angled fittings (e.g. tees, full elbows, slant elbows) snugly within a fitting cavity for torquing onto a fixed threaded end of pipe. Torquing of the fitting is accomplished by inserting a drive stud of the driving device into a drive aperture defining a rotational axis and torquing the driving device, thereby rotating the socket about the rotational axis, or through manually torquing a cylindrical portion of the socket. The socket offers superior efficiency and safety over conventional pipe wrenches by maximizing the effective range of movement available for a wrench used for angled fitting installation and/or removal, while virtually eliminating a wrench's loss of grip on the fitting.

12 Claims, 4 Drawing Sheets

PIPE FITTING SOCKET FOR USE WITH AN AXIAL DRIVE MECHANISM

TECHNICAL FIELD OF THE INVENTION

The present invention relates to plumbing tools, more particularly wrenches for manipulating threaded pipe fittings.

BACKGROUND OF THE INVENTION

Pipe fittings are used to join together lengths of pipe. They have two or more fitting ends, connected via short lengths of tubing. Fittings for threaded pipe have at least one fitting end that is threaded, and may be male or female in a variety of different diameters, as needed to threadingly mate with a given threaded pipe end.

Angled fittings have a bend in the tubing between two of the fitting ends. Three of the most common varieties of angled fittings are the elbow fitting, which comprises two female threaded ends joined by a specific angle of tubing (usually 90 degrees, but other angles are available, e.g. 45 degrees, 22.5 degrees); the tee fitting, which comprises three threaded ends, which can be male or female, two of which are joined by a straight length of tubing, and one of which is at a 90 angle to the other two; and the street elbow, which is similar to the elbow fitting, except that one of the threaded ends has a male thread.

Angled fittings typically require the use of a pipe wrench for installation and removal. A pipe wrench typically comprises a handle and an adjustable/rocking jaw that are arranged such that forward force exerted upon the handle causes the adjustable jaw to rock back in a way that tightens the jaw, and backward force on the handle tends to loosen it. Thus, when the jaw is loosened, the wrench can be rotated while the loosened jaw slips around the pipe. Teeth also line the interior of the jaw such that forward force on the handle causes the teeth to dig into an object (e.g. a pipe fitting) placed within the jaw of the pipe wrench. Thus, forward force exerted upon the handle tightens the jaw until the object within the jaw turns with the wrench. Once the wrench reaches the end of its range of movement, backward force is applied to the handle to loosen the jaw, and the wrench may be rotated back within its range of movement to re-grip the object for further tightening. The range of movement of a conventional pipe wrench is determined by whatever structure or immovable obstacles surround the object being tightened. For example, when installing and/or removing pipe fittings, it is common to be assembling pipe lines along or between walls or joists.

Several problems exist with the current state of the art in pipe fitting installation and removal, especially when said installation and/or removal occurs in limited access areas. Where angled fittings have been installed in confined spaces or where surrounding equipment has been installed after an initial pipe installation, conventional pipe wrenches can render pipe installation extremely inconvenient. This is because conventional pipe wrenches require the use of a long handle, which places space at a premium during installation. This problem is further exacerbated by the bulkiness of the jaw of a conventional pipe wrench, which often severely restricts the jaw's range of movement. For example, the jaw wraps around three sides of an imaginary square containing the round pipe/fitting, and the jaw has strengthening structure extending outward from the jaw faces. Compounding the problem is the fact that the first part of the tightening movement is lost to the rocking jaw movement until it tightens enough to be able to turn the fitting. Consequently, pipe installation and removal professionals are either forced to remove and reinstall surrounding equipment or else struggle to work around it, using a wrench limited to a very small effective range of movement (10 to 20 degree effective range is not uncommon). Under these conditions, pipe and fitting assembly is frustratingly slow, excessively difficult and inefficient.

The tendency for conventional pipe wrenches to slip while being forcefully turned adds to the difficulty of tight quarters work and also adds risk of injury to piping professionals and/or damage to nearby equipment and structures. Additionally, the slippage inherent in conventional pipe wrenches can decrease overall productivity. Finally, the teeth in conventional pipe wrenches tend to mar and/or score pipe/fitting surfaces.

Therefore it is an object of the present invention to provide a tool that is capable of installing and removing pipe fittings more efficiently, especially in limited access areas, thereby increasing productivity and reducing the risk of damage and injury.

BRIEF SUMMARY OF THE INVENTION

According to the invention an apparatus is disclosed for torquing an angled pipe fitting relative to a fixed threaded end of pipe having a longitudinal axis, wherein the angled fitting has an axial arm and a lateral arm, and wherein the torque must be applied about an axis of the axial arm of the angled fitting while it is coaxially aligned with the longitudinal axis of the fixed threaded end, the apparatus comprising: a socket that has an axial drive attachment defining a socket rotational axis, wherein the axial drive attachment facilitates attachment of an axial driving device to the apparatus; and a fitting cavity axially distal to the drive aperture, wherein: the fitting cavity opens axially outward and comprises an axial canal about the socket rotational axis, and a lateral canal that extends laterally outward relative to the socket rotational axis; the axial canal is shaped and dimensioned to receive the axial arm of the angled fitting and to hold it such that the axial arm axis is coaxial with the socket rotational axis; and the lateral canal is shaped and dimensioned to receive the lateral arm of the fitting and to hold it against torque about the axial arm axis.

According to the invention the apparatus may further comprise a flange recess in the lateral canal, wherein the flange recess is shaped and dimensioned to accept a fitting flange rimming the end of the lateral arm of the angled fitting.

According to the invention the apparatus may further comprise a socket flange rimming a laterally outward end of the lateral canal, positioned such that when the angled fitting is inserted into the fitting cavity, the socket flange holds the angled fitting against lateral movement out of the fitting cavity. Preferably there is an opening through the socket flange; wherein the socket flange opening opens both laterally outward and axially outward, and is shaped and dimensioned to accept the diameter of a length of pipe; thereby enabling an angled fitting with the length of pipe threadingly mated to its lateral arm to be axially inserted such that the mated length of pipe extends through the socket flange opening.

According to the invention the apparatus may further comprise a drive cylinder arranged coaxially about the socket rotational axis, thereby facilitating torquing of the socket by hand. Preferably there are friction elements on its surface; for example a series of grooves extending axially along the surface of the drive cylinder.

According to the invention the axial drive attachment preferably comprises a drive aperture coaxially aligned with the socket rotational axis, wherein the drive aperture is shaped and dimensioned for removably engaging with a drive stud of the axial driving device.

According to the invention the axial driving device preferably comprises a ratcheting wrench, or a motor drill.

According to the invention the apparatus may further comprise hexagonal facets around the axial canal, thereby enabling a hexagonal flange on a fitting to be inserted such that the hexagonal flange's rotational axis is coaxial with the socket's rotational axis.

According to the invention the axial canal further comprises an arm recess that extends axially inward of the lateral canal, towards the drive attachment end of the socket, the arm recess being shaped and dimensioned to receive an axial arm of the angled fitting.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199a, 199b, 199c, etc. Or, related but modified elements may have the same number but are distinguished by primes. For example, 109, 109', and 109" are three different elements which are similar or related in some way, but have significant modifications. Such relationships, if any, between similar elements in the same or different figures will become apparent throughout the specification, including, if applicable, in the claims and abstract.

Figure 2:
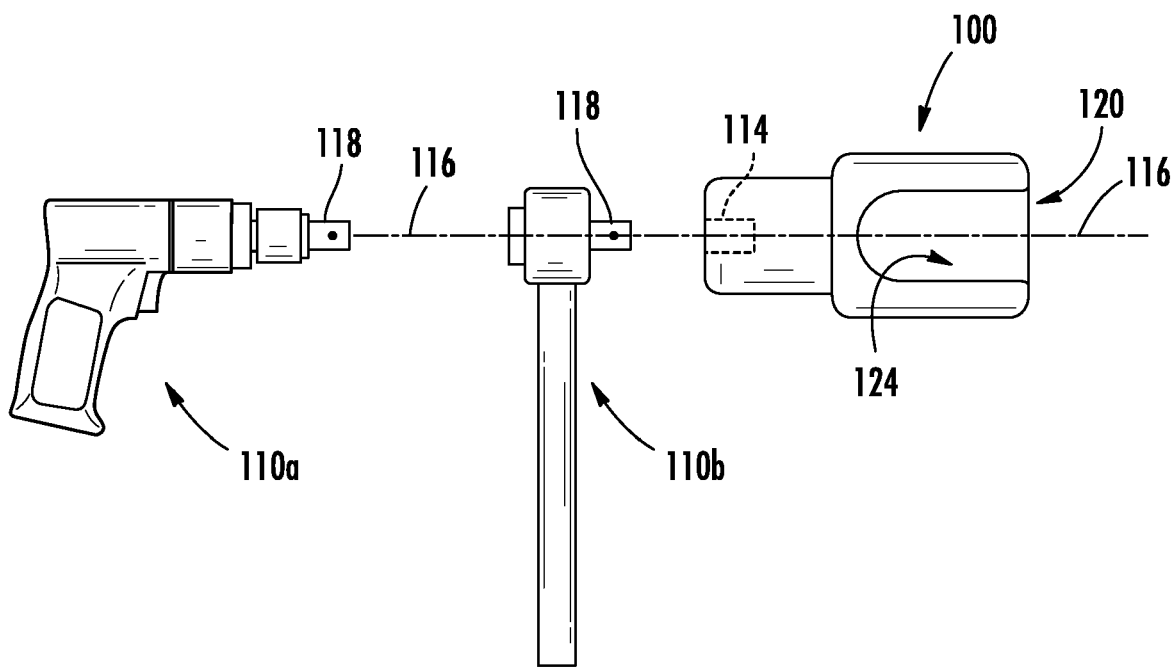
Figure 3:
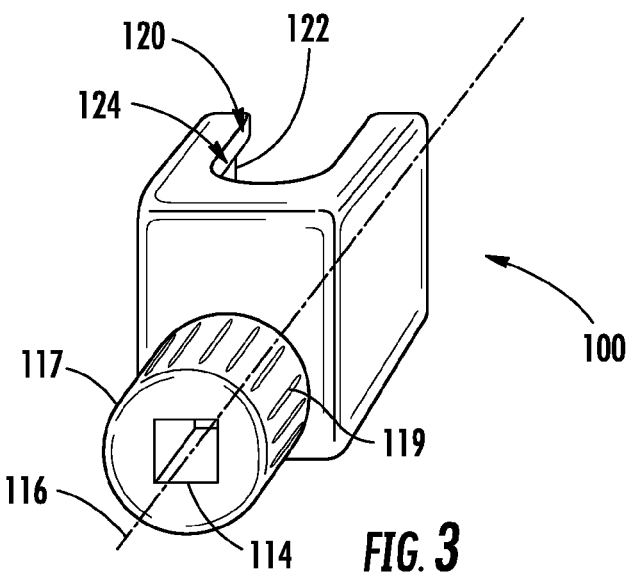
Figures 4A, 4B:
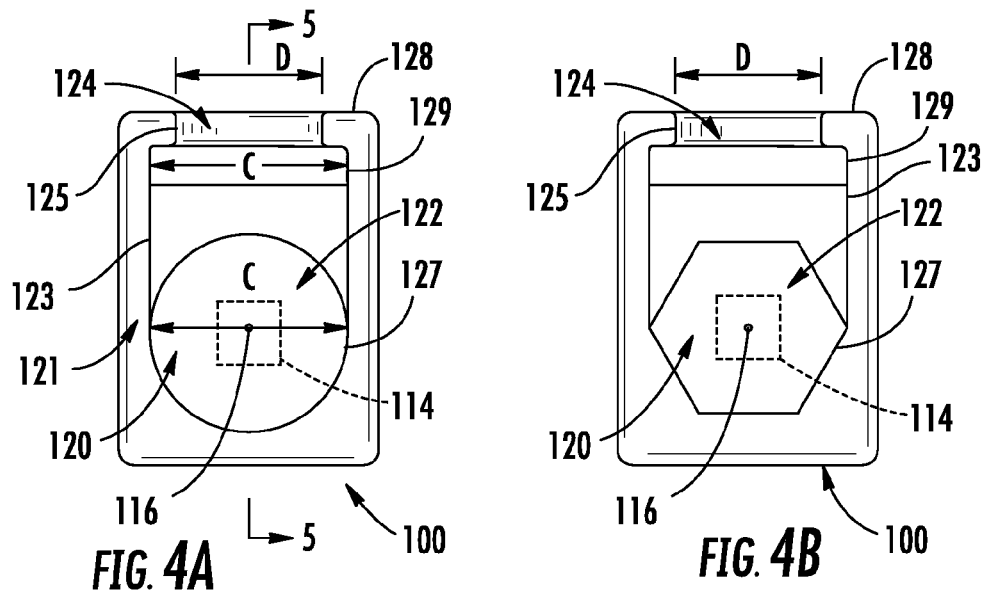
Figure 5:
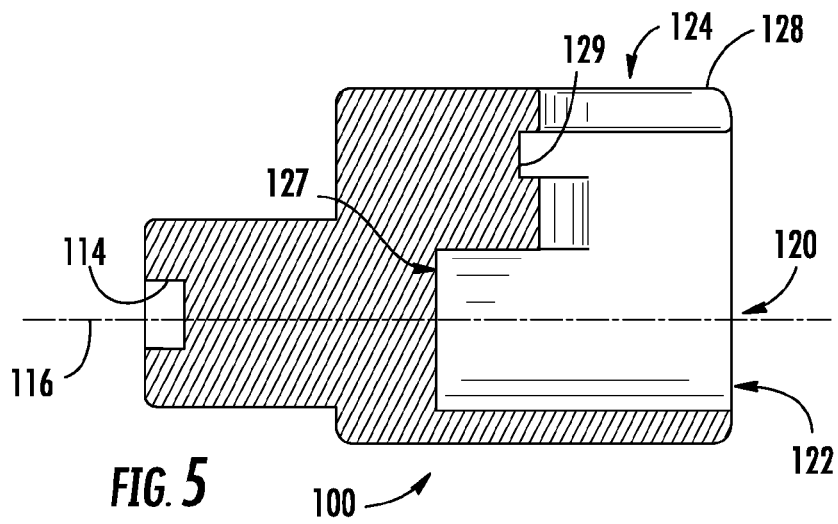

The structure, operation, and advantages of the present preferred embodiment of the invention will become further apparent upon consideration of the following description taken in conjunction with the accompanying drawings, wherein:

FIGS. 1A-1D are side views of four common angled fittings that can be accommodated by the inventive socket, as well as a side view of a fixed threaded end of pipe to which an angled fitting is to be applied;

FIG. 2 is a top view of the inventive socket and two examples of axial drive mechanisms accommodated by the inventive socket;

FIG. 3 is a perspective view of the inventive socket, showing a side, top, and drive end;

FIGS. 4A-4B are views of a fitting end of two embodiments of the inventive socket;

FIG. 5 is a cross-sectional side view of the inventive socket; and

FIGS. 5A-5D are side views of three angled fittings (ghosted outline) that have been inserted into a fitting cavity (also ghosted) of the inventive socket, all according to the invention.

DETAILED DESCRIPTION OF THE INVENTION

Although the drawings and the proceeding description disclose angled fittings with female threaded ends (the most common form), it should be understood that the inventive socket accepts angled fittings with male or female threaded ends. The use of angled fittings with female threaded ends in the drawings and proceeding description is meant to be illustrative and is not intended to be limiting in nature.

It will be shown that the inventive socket 100 is particularly suited to advantageously handle a variety of angled pipe fittings, including the most commonly used ones.

Figure 1A:
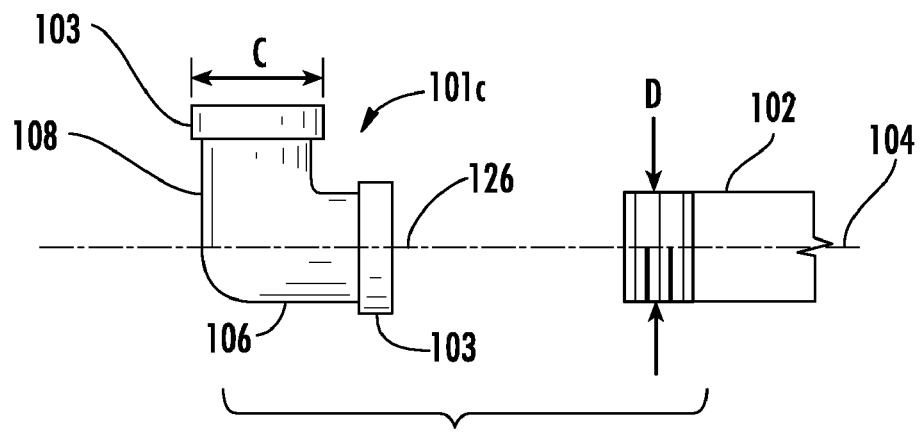

FIG. 1A shows a first example of an angled fitting 101, specifically a full elbow 101c (i.e., a ninety degree elbow), shown coaxially aligned with a fixed threaded end 102 (e.g. a male threaded end of a length of pipe) that has a longitudinal axis 104. The full elbow 101c comprises a lateral arm 108 joined perpendicularly to an axial arm 106, through which runs the axial arm's axis of rotation 126. A fitting flange 103 rims the end of each of the lateral arm 108 and the axial arm 106 and defines a diameter referenced as dimension C.

For any angled fitting 101, when an arm's axis of rotation 126 (e.g. the axial arm 106) is coaxial with the fixed threaded end's longitudinal axis 104, the axial arm 106 may be torqued around the axial arm's axis of rotation 126, thereby threadingly mating the angled fitting 101 with the fixed threaded end 102. The fixed threaded end 102 is either male or female, as needed to mate with the angled fitting 101, and can be an end of any portion of threaded piping that requires assembly with an angled fitting 101. For example, the fixed threaded end 102 can be at the free end of any length of pipe, including a nipple; or, for example, can be at the free end of a street elbow.

Figure 1B:
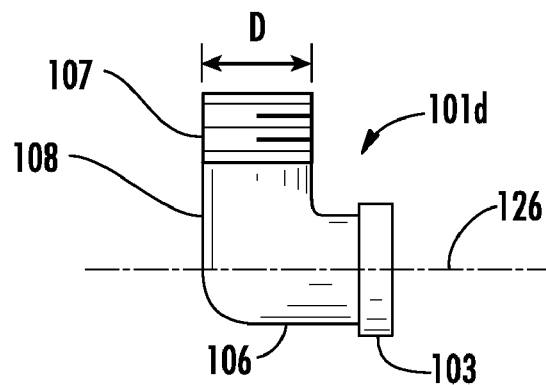

FIG. 1B shows an example of an angled fitting 101, specifically a street elbow 101d. The street elbow 101d comprises a lateral arm 108 joined perpendicularly to an axial arm 106, through which runs the axial arm's axis of rotation 126. Unlike a typical full elbow 101c, the street elbow 110d has one female threaded end with a flange 103, and one male threaded end 107 having a diameter referenced as dimension D. The male threaded end 107 on a street elbow 101d makes a shorter connection possible between two consecutive elbows that would otherwise need to be interconnected by a pipe nipple. Generally, the male threaded end 107 on a street elbow 101d extends farther out from the bend than the female threaded end with a flange 103.

Figure 1C:
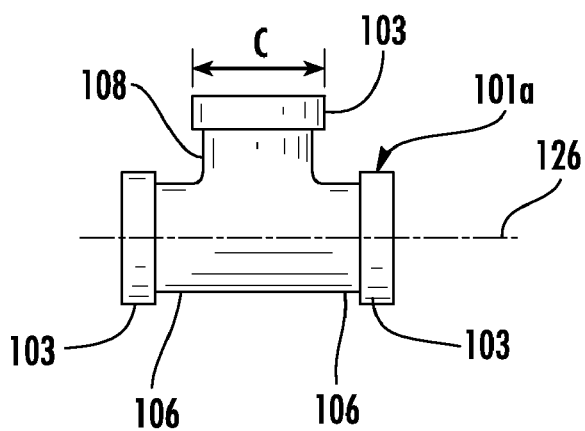

FIG. 1C shows an example of an angled fitting 101, specifically a tee 101a, that can be accepted by the socket 100. The tee 101a comprises two axial arms 106 that are joined to form a linear portion, and a lateral arm 108 that is joined perpendicularly to the two axial arms 106. The lateral arm 108 has a dimension C defined by the diameter of the lateral arm's 108 fitting flange 103. An axis of rotation 126 is shown for the linearly combined axial arms 108. A standard fitting flange 103 is shown on each female threaded end.

Figure 1D:
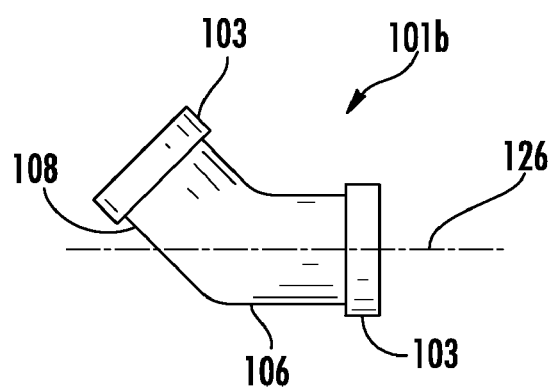

FIG. 1D shows an example of an angled fitting 101, specifically a slant elbow 101b, that can be accepted by the socket 100. The slant elbow 101b comprises a lateral arm 108 joined at a 45 degree angle to an axial arm 106, through which runs the axial arm's axis of rotation 126. Although FIG. 1D illustrates a slant elbow 101b with a 45 degree elbow, slant elbows exist with angles other than 45 degrees. Thus, references to slant elbows herein should be understood to include any angle of elbow other than 90 degrees.

FIG. 2 illustrates a top view of the socket 100 showing a lateral canal 124 into a fitting cavity 120, along with two exemplary axial driving devices 110: a motor drive 110a and a ratcheting wrench 110b. The axial driving devices 110 have a drive stud 118, typically square in cross section, which is insertable into a mating drive aperture 114 of the socket 100. (As in all of the drawings, hidden lines are shown as ghosted outlines.) When the drive stud 118 is inserted into the drive aperture 114, the axial driving device 110 becomes coaxially aligned with a rotational axis 116 of the socket 100, and therefore can easily be used to torque the socket 100 about its rotational axis 116. The drive aperture 114 is a preferred embodiment of what can be generally called an axial drive attachment for the socket 100, wherein the axial drive attachment (e.g., aperture 114) facilitates attachment of an axial driving device 110 to the socket 100. Given the teaching herein, other forms of the axial drive attachment may become apparent. For example: The drive aperture 114 form is coaxially aligned with the socket rotational axis 116, and is shaped and dimensioned for removably engaging with the drive stud 118. Alternatively, the axial drive attachment could be an externally faceted stud coaxially aligned with the socket rotational axis 116, and shaped and dimensioned for removably engaging with a ratcheting-ring type of axial driving device 110. Alternatively, the axial drive attachment could be a permanent connection between a ratcheting wrench mechanism (driving device 110) and the socket 100. Other forms and variations may become apparent, all of which are intended to be within the scope of the present invention.

FIG. 3 illustrates a perspective view of the socket 100. Its rotational axis 116 is defined by the drive aperture 114, which is located in a socket cylinder 117. The socket cylinder 117 is cylindrically shaped and coaxial with the socket rotational axis 116 so that the socket 100 can be conveniently hand torqued (manually) about the rotational axis 116. Preferably the socket cylinder 117 has friction/grip-enhancing elements 119 to improve grip and further facilitate hand torquing of the socket, the elements 119 being grooves, ridges, knurling, rubber coating, or the like. The drive aperture 114 is axially distal to the fitting cavity 120. The fitting cavity 120 comprises a lateral canal 124, which is normal to the socket's rotational axis 116 (extending laterally outward), and an axial canal 122, which is aligned with (coaxial with) the rotational axis 116.

FIG. 4A illustrates a fitting end of the socket 100. The fitting end face 121 is open for receiving the angled fitting 101 in the fitting cavity 120, which comprises the axial canal 122 with an arm recess 127; and the lateral canal 124 with a lateral branch 123, as well as preferably a socket flange opening 125 in a socket flange 128 that defines a flange recess 129.

The axial canal 122 is shaped and dimensioned to receive the axial arm 106 of an angled fitting 101. In particular, the axial canal 122 is shaped and dimensioned to snugly fit around the fitting flange 103 of a female threaded end and the lateral canal 124 is shaped and dimensioned to snugly fit around the lateral arm 108 of the angled fitting 101. If, as is usually the case, the angled fitting is a full elbow 101c with a flanged 103 female threaded end on the lateral arm 108, then the fitting flange 103 will rest in the flange recess 129, held in by the socket flange 128 which prevents the angled fitting 101 from rocking or falling out the top of the lateral canal 124. As best illustrated in FIG. 5, the socket flange 128 preferably rims the entire socket flange opening 125, minimizing jiggling of the fitting 101 when the fitting 101 is inserted into the fitting cavity 120. The socket flange 128 partially surrounds the lateral canal 124, forming the socket flange opening 125. Because an inside dimension D of the socket flange opening 125 is smaller than an inside dimension C of the flange recess 129, the angled fitting 101 is held snugly within the fitting cavity 120. Dimension C also matches outside dimension C of the fitting flange 103 of the full elbow 101c and the tee 101a, further minimizing rocking of the fittings 101c and 101a inside the fitting cavity 120. Additionally, dimension C matches the diameter of both the arm recess 122 and the axial canal 120, which consequently matches the diameter of the fitting flange 103, minimizing lateral jiggling of the axial arm 106 in the axial canal 122. For the street elbow 101d, inside dimension D of the socket flange opening 128 matches outside dimension D of the male fitting end 107 of the street elbow 101d, further minimizing rocking of the male fitting end 107 inside the lateral canal 124. Furthermore, because inside dimension D of the socket flange opening 128 matches outside dimension D of the street elbow's 101d male fitting end 107, it should be obvious that dimension D is also sized to receive the diameter of a fixed threaded end 102. Consequently, the socket 100 will also accommodate an angled fitting 101 with a length of pipe (e.g., a nipple) already mated to the lateral arm 108 of the angled fitting 101.

Since threaded pipe and its fittings come in a variety of nominal sizes (e.g., ¼ inch, ½ inch, ¾ inch, 1 inch, and so on), the inventive socket 100 will also come in the same variety of sizes, each one being suitably dimensioned for working with a particular nominal size of angled fittings. Although not a limiting part of the invention, it may be noted that as the pipe size increases, the axial drive stud size and/or driving mechanism is preferably increased correspondingly to accommodate any need for increased amounts of applied torque. Of course other means (e.g., reinforcement, stronger materials, etc.) could also be used.

In a preferred embodiment of the invention, as shown in FIG. 4A, the axial canal 122 is substantially circular and dimensioned to receive the typically circular fitting flange 103 on the axial arm(s) 106 of an angled fitting 101. FIG. 4B illustrates an optional embodiment of the invention, wherein the axial canal 122 has hexagonal facets, i.e., is hexagonally shaped, enabling it to receive, and grip for torquing, a hexagonally shaped fitting flange on an axial arm 106 of a pipe fitting that may be, but isn't necessarily, an angled fitting 101.

Figure 5A:
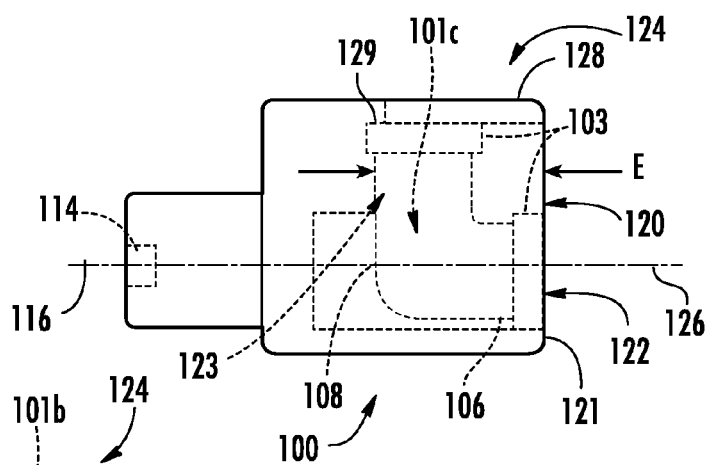

FIG. 5 illustrates a cross sectional side view of the socket 100, and FIG. 5A illustrates a full elbow that has been inserted into the fitting cavity 120. Referring to FIG. 5A, the lateral arm 108 extends along the lateral canal 124, where the flange recess 129 accepts the fitting flange 103 of the female threaded end. The axial arm 106 extends along the axial canal 122 such that the axial arm's rotational axis 126 is coaxial with the socket's rotational axis 116, and consequently the axial arm 106 can be torqued by an axial driving device 110 onto a fixed threaded end 102 when its longitudinal axis 104 is also aligned (as shown in FIG. 1A).

A dimension E bounded by the face 121 of the fitting end of the axial canal 122 and the axially opposite side of the lateral branch 123 is sized such that the axial arm's fitting flange 103 is contained within, and ideally flush with, the face 121 of the fitting end of the axial canal 122, preventing the angled fitting 101 from wiggling relative to the rotational axis 116. The angled fitting 101 thus fits snugly into the socket 100.

Figure 5B:
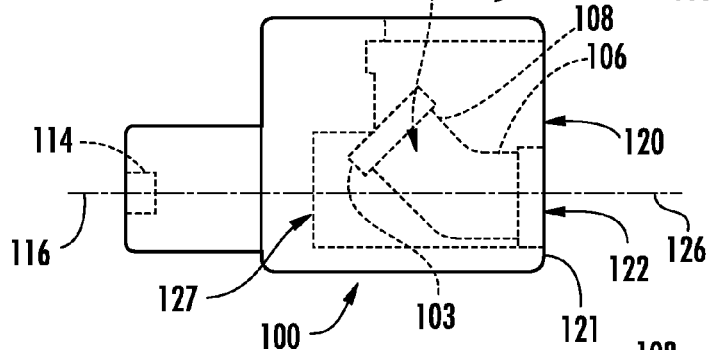

FIG. 5B illustrates an optional socket embodiment wherein a slant elbow 101b can be inserted into the socket 100. The lateral arm 108 extends part way into the lateral canal 124, which is hollowed out to accommodate a fitting flange 103 on the slant elbow 101b such that the end of the lateral arm 108 butts against an edge of the arm recess 127, and is shaped and dimensioned such that the axial arm's fitting flange 103 is contained within, and ideally flush with, the face 121 of the fitting end of the axial canal 122. The slant elbow fitting 101b thus fits snugly into the socket 100. The axial arm 106 extends along the axial canal 122 such that the axial arm's rotational axis 126 is coaxial with the socket's rotational axis 116, and consequently the axial arm 106 can be torqued onto a fixed threaded end 102. This embodiment is optional because the hollowed out part of the fitting cavity 120 may cause a somewhat sloppy fit for the more commonly used full elbow 101c and tee 101a types of angled fittings 101. If desired, the socket 100 could be made in different versions, with one version being specifically fitted to a slant fitting 101b only.

Figure 5C:
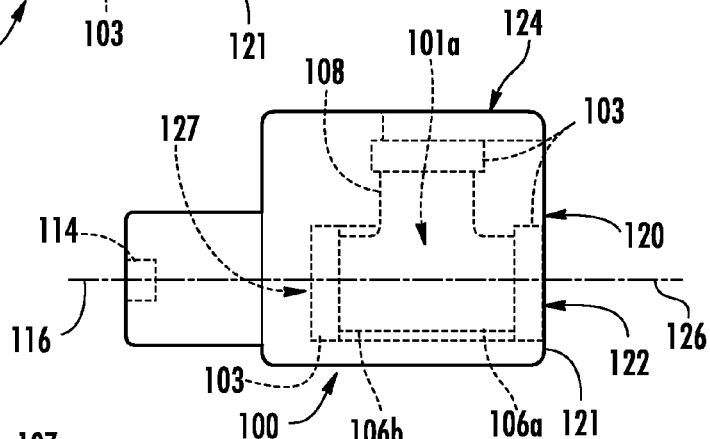

FIG. 5C illustrates a tee 101c that has been inserted into the socket 100. The lateral arm 108 extends along the lateral canal 124, where the flange recess 129 accepts the fitting flange 103 of a female threaded end. Both of a first axial arm 106a and a second, collinear, axial arm 106b extend along the axial canal 122. The arm recess 127 extends the axial canal 122 deep enough to receive the second axial arm 106b while aligning the lateral arm 108 and the first axial arm 106a with the rest of the fitting cavity 120 substantially the same as the alignment of a full elbow 101c. Thus the tee 101a fits snugly into the socket 100, and the axial arm's rotational axis 126 is coaxial with the socket's rotational axis 116, such that the first axial arm 106a can be torqued onto a fixed threaded end 102.

Figure 5D:
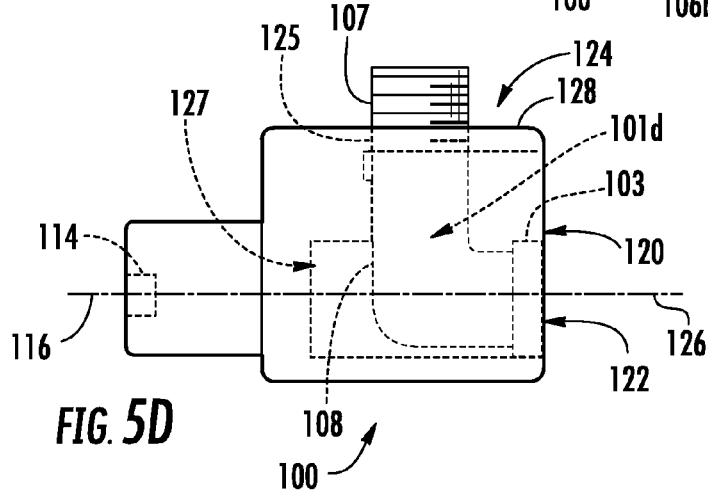

FIG. 5D illustrates a street elbow 101c that has been inserted into the fitting cavity 120 of the socket 100. The lateral arm 108 extends along the lateral canal 124, and the male threaded end 107 of the lateral arm 124 extends through the socket flange opening 125 such that the socket flange 128 snugly grips the male threaded end 107. The axial arm 106 extends along the axial canal 122 such that the axial arm's rotational axis 126 is coaxial with the socket's rotational axis 116, and consequently the axial arm 106 can be torqued by an axial driving device 110 onto a fixed threaded end 102 when its longitudinal axis 104 is also aligned (as shown in FIG. 1A).

Once an angled fitting 101 has been positioned snugly into the socket 100 via the fitting cavity 120, the socket 100 can be torqued about the rotational axis 116 defined by the drive aperture 114. Torque to start the mating can be applied by manually turning the socket cylinder 117, thereby allowing the greatest control to avoid cross threading. When the parts are mated enough to make manual torquing difficult, then the axial driving device 110 is used. Because the socket rotational axis 116 is coaxial with the fitting axial arm's rotational axis 126, which in turn is coaxial with the longitudinal axis 104 of the fixed threaded end 102, the angled fitting 101 is rotated about the axial arm's rotational axis 126 and is easily torqued onto the fixed threaded end 102.

The socket 100 renders the process of torquing the angled fitting 101 onto a fixed threaded end 102 both safer and more efficient than it is with a conventional pipe wrench. This is because the snug fit afforded by the socket 100 minimizes wiggling and also because the socket 100 has no jaw that can come loose and slip during torquing. Additionally, the fact that the drive aperture 114 accepts the drive stud 118 of an axial driving device 110 means that the socket 100 can be easily used to install an angled fitting 101 in very limited access areas. Unlike the offset drive of a pipe wrench, an axial drive need not have any structure protruding radially beyond the fitting, and the handle (if present) extends radially rather than tangentially from the fitting. Therefore, given the same set of obstacles around the pipe fitting installation point, the axial drive has a larger range of motion than the pipe wrench. Furthermore, a ratcheting axial drive device, having virtually zero slack re-gripping motion, also has a larger effective range of motion. Even further, if a motor drive is used, especially with a flexible shaft, the effective range of motion becomes virtually infinite.

Although the invention has been illustrated and described in detail in the drawings and foregoing description, the same is to be considered as illustrative and not restrictive in character it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. Apparatus for torquing an angled pipe fitting relative to a fixed threaded end of pipe having a longitudinal axis, wherein the angled fitting has an axial arm and a lateral arm each with a threaded fitting end, and wherein the torque must be applied about an axis of the axial arm of the angled fitting while it is coaxially aligned with the longitudinal axis of the fixed threaded pipe end, the apparatus comprising:

a socket that has an axial drive attachment defining a socket rotational axis, wherein the axial drive attachment facilitates attachment of an axial driving device to the apparatus;

a fitting cavity axially distal to the axial drive attachment, wherein:

the fitting cavity comprises an axial canal about the socket rotational axis, and a lateral canal that extends laterally outward relative to the socket rotational axis;

the fitting cavity opens axially outward and is shaped and dimensioned to enable axial insertion of the angled fitting into both the axial canal and the lateral canal;

the lateral canal comprises a socket flange extending at least partly across the lateral canal, and having a socket flange opening that is smaller than an outside dimension of a fitting flange of the angled fitting's lateral arm;

the socket flange is positioned to be laterally outward of the angled fitting's lateral arm fitting flange when the angled fitting is axially inserted into the fitting cavity, thereby holding the lateral arm against lateral movement out of the fitting cavity;

the axial canal is shaped and dimensioned to receive the axial arm of the angled fitting and to hold it such that the axial arm axis is coaxial with the socket rotational axis; and the lateral canal is shaped and dimensioned to receive the lateral arm of the fitting and to hold it against torque about the axial arm axis.

2. The apparatus of claim 1, further comprising:

a flange recess in the lateral canal, wherein:

the flange recess is shaped and dimensioned to accept and hold a fitting flange rimming the lateral arm of the angled fitting.

3. The apparatus of claim 1, wherein:

the socket flange extends completely across the lateral canal, such that the socket flange opening is zero-dimensioned.

4. The apparatus of claim 1, wherein:

the socket flange opening is shaped and dimensioned to accept the diameter of a length of pipe;

thereby enabling an angled fitting with the length of pipe threadingly mated to its lateral arm to be axially inserted such that the mated length of pipe extends through the socket flange opening.

5. The apparatus of claim 1, further comprising:

a drive cylinder arranged coaxially about the socket rotational axis, thereby facilitating torquing of the socket by hand.

6. The apparatus of claim 5, wherein the drive cylinder further comprises:
friction elements on its surface.

7. The apparatus of claim 6, wherein the friction elements further comprise:
a series of grooves extending axially along the surface of the drive cylinder.

8. The apparatus of claim 1, wherein the axial drive attachment further comprises:
a drive aperture coaxially aligned with the socket rotational axis, wherein the drive aperture is shaped and dimensioned for removably engaging with a drive stud of the axial driving device.

9. The apparatus of claim 1, wherein:
the axial drive attachment is shaped and dimensioned for removably engaging with a ratcheting wrench type of axial driving device.

10. The apparatus of claim 1, wherein:
the axial drive attachment is shaped and dimensioned for removably engaging with a motor drill type of axial driving device.

11. The apparatus of claim 1, further comprising:
hexagonal facets around the axial canal, thereby enabling the axial canal to receive, and grip for torquing, a hexagonally shaped fitting flange on a pipe fitting.

12. The apparatus of claim 1, wherein the axial canal further comprises:
an arm recess that extends axially inward of the lateral canal, towards the drive attachment end of the socket, the arm recess being shaped and dimensioned to receive an axial arm of the angled fitting.

* * * * *